Figure 1:
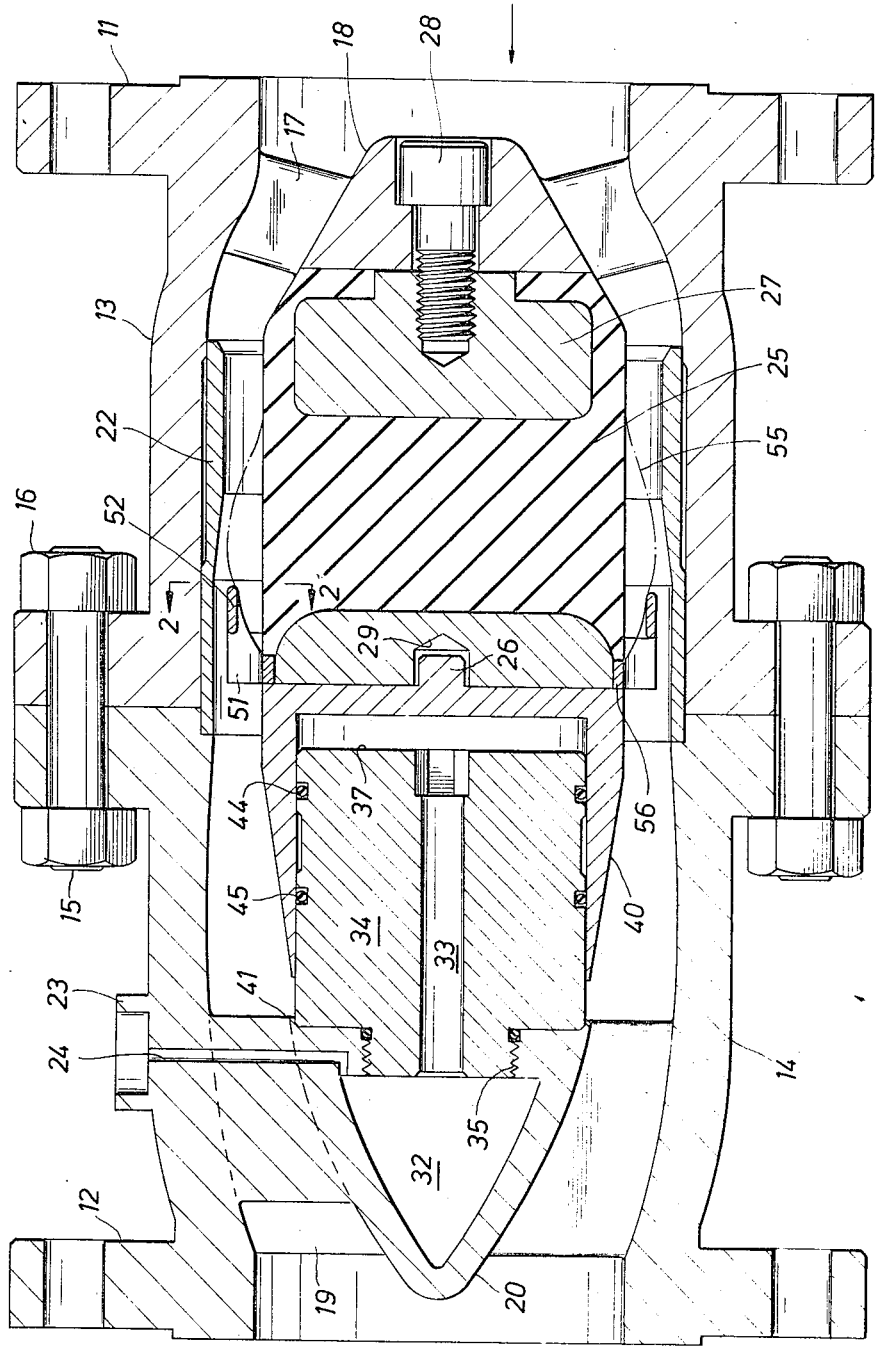

United States Patent [19]
Welker

[11] 3,746,300
[45] July 17, 1973

[54] FLOW REGULATOR
[75] Inventor: Robert H. Welker, Houston, Tex.
[73] Assignee: Texsteam Corporation, Houston, Tex.
[22] Filed: May 5, 1971
[21] Appl. No.: 140,485

[52] U.S. Cl. .............................. 251/63.5, 251/191
[51] Int. Cl. ..................... F16k 31/12, F16k 7/02
[58] Field of Search.................. 251/63.5, 191, 61.2, 251/61.1, 5

[56] References Cited
UNITED STATES PATENTS
| | | | |
|---|---|---|---|
| 2,917,269 | 12/1959 | Welker | 251/63.5 |
| 3,095,904 | 7/1963 | Thaning | 251/191 X |
| 3,380,470 | 4/1968 | Culpepper, Jr. | 251/63.5 X |
| 3,446,234 | 5/1969 | Hungate | 251/191 X |

FOREIGN PATENTS OR APPLICATIONS
588,762   12/1959   Canada................................. 251/191

Primary Examiner—Arnold Rosenthal
Attorney—Lloyd L. Zickert

[57] ABSTRACT

In a flow regulator for a pipeline or the like, an apparatus which includes a plug of resilient material. The plug is expanded and bulges on its outer surface to controllably limit flow between the outer surface and a surrounding passage or chamber. The plug is damaged by an extremely high flow rate. The improvement disclosed herein incorporates a plurality of ribs to be contacted against the downstream portion of the expandable plug, the ribs being tied together by an encircling ring. The ribs control and limit the shape of the plug as it expands.

6 Claims, 2 Drawing Figures

PATENTED JUL 17 1973

3,746,300

Robert H. Welker
INVENTOR

BY  Donald Gunn
  ATTORNEY

FLOW REGULATOR

RELATED APPLICATIONS

Applicant is the inventor of U. S. Pat. No. 2,917,269, issued Dec. 15, 1959.

SUMMARY OF PROBLEM AND SOLUTION

As disclosed in the above mentioned patent, flow regulators have been utilized in which a rubber plug within a chamber is controllably squeezed and therefore expanded to regulate the flow through the apparatus. The device of the mentioned patent has found substantial acceptance, and in most regards, has served extremely well. It has particularly been effective for low to medium pressure differentials. For example, a medium pressure differential might be 500 PSI.

In the event of substantially increased pressures, typically reaching as much as 1,000 PSI on pipelines traversing a great distance of the country, substantial problems have been encountered. When the plug of the above noted patent is compressed and hence expands to decrease the flow volume between the plug and the surrounding chamber, the pressure drop across the plug causes the resilient material to flow. The plug should customarily expand in a symmetrical manner on the application of an expanding force to the plug. However, the pressure drop across the plug forces the expanding material to the rear of the plug. The plug still expands, but the expansion manifests itself physically at the rear portion of the plug. As the plug is then further expanded and brought into contact with the surrounding chamber, the plug is exposed to unwanted, badly distributed stresses. These stresses cause failures wherein large pieces of the resilient material are torn away from the plug. These pieces are torn away at the expanded portion, well toward the rear of the plug. As a consequence, the plug will fail. The plug, even when it does not fail in the manner described above, does not function in the intended manner. The expansion of the material at the rearward portion of the plug relocates the line of contact of the plug with the surrounding chamber. This therefore changes the mode of operation of the plug and increases the possibility of aerodynamic turbulence in the downstream section of the regulator because of the abrupt change in form at the point of regulation. Such turbulence is a noise source and reduces the efficiency of the device.

It is with these problems, and many others, in view that the improvement of the present invention is summarized as being an improvement in a flow regulator wherein a number of shaping vanes or ribs fit snugly about the plug at the rearward end to control the shape of the plug as it expands. The vanes bear against the plug to force it to expand in a more symmetrical manner. The vanes reduce the size of the rearward bulge on expansion and high pressure drop across the apparatus. The vanes are preferably individually joined together at two points by encircling rings which secure the set of vanes. The vanes include gaps therebetween to permit continued flow through the modified or improved flow regulator. The apparatus further includes a closed chamber adapted to be communicated with a source of pressure fluid. The closed chamber incorporates a piston and cylinder arrangement whereby the end plate on the plug is forced by expansion within the chamber against the plug to expand the diameter of the plug.

Figure 2:
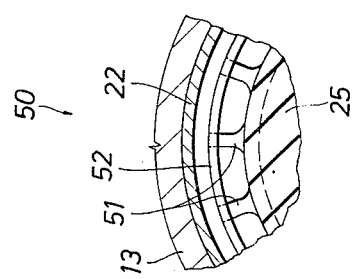

Many objects and advantages of the present invention will become more readily apparent from a consideration of the following written specification and included drawings, which are:

FIG. 1 is a sectional view through the modified flow controller in accordance with the present invention which illustrates the surrounding ring and vane which control the expansion of the resilient plug of the flow controller; and, FIG. 2 is a sectional view taken along the line 2—2 of FIG. 1 illustrating details of construction of the ring and vanes which enclose and limit the expansion of the resilient member.

Attention is first directed to the flow controller as indicated generally by the numeral 10 in FIG. 1. The flow controller is adapted to be installed in a pipeline or similar conduit for communicating a great volume of fluid. It is typically utilized in a gas pipeline, and regulates the flow. The improved flow regulator of the present invention is shown in sectional view in FIG. 1 and is aptly suited for installation in the pipeline. Customarily, it is used for regulating the flow of natural gas and similar products. The apparatus is provided with means for connection to the pipeline, including a first flange 11 and a second flange 12 which are both suitably adapted for bolted connection with the pipeline. The pipeline may have any nominal diameter, and hence, the device of the present invention can be relatively small or quite sizeable, depending upon the needs of the particular application.

The flow regulator 10 is comprised of an external housing which includes a first component 13 and a second housing member 14. The housing members 13 and 14 abut and are joined by suitable bolts 15 and nuts 16. The bolts are passed through openins for that specific purpose in flanges found on the two housing members 13 and 14. The housing members describe an encircling enclosure with openings through the flanges 11 and 12 for communication with the source of fluid flow. The joined structure describes what may be summarized as an internal cylindrical passage.

The housing member 13 includes internally directed support struts 17 which center and position a somewhat streamlined end plate 18 connected with the expandable plug as will be described. By way of contrast, the housing member 14 includes internally radially directed support struts 19 which support a tapered housing 20 which is streamlined on the downstream side of the flow. The nose 18 plus the tapered end 20 when viewed as a whole in FIG. 1 describe a relatively streamlined bullet-shape which reduces to a minimum the turbulance caused by the insertion of the device of the present invention into the pipeline. It should be noted that the components of the present invention worl in conjunction with the streamlined shape which is materially aided by the arrangement of the components which will be described hereinafter.

A sleeve 22 is inserted into the cylindrical passage, and the sleeve functions immediately adjacent to the expandable resilient plug as will be described. The sleeve 22 serves as a seat against which the plug expands and contacts to controllably throttle the annulus to thereby regulate the flow rate in the pipeline. The housing 14 includes an external port 23 which is in communication with the passage 24 extending through the strut 19 for delivery of hydraulic fluid under extremely high pressures to control and operate the flow regulator of the present invention. More will be noted concerning this hereafter.

Directing attention next to the plug itself, a resilient plug is indicated by the numeral 25. The plug 25 is caught between the pair of end faces which include a first end plate 26 and a second end plate 27. The plate 27 is recessed into the plug 25, and is cast integrally therewith. The resilient material of the plug substantially encircles the plate 27. The plate 27, being encircled, nevertheless presents a relatively narrow face at the forward end of the resilient plug and a tapped opening is provided therein for receiving a bolt 28. The bolt 28 joins the nose piece 18 to the resilient plug 25. The bolt is threaded through the nose piece and is pulled snug to secure the resilient expandable plug in position.

By way of contrast, the back end or face of the plug is integrally cast to a plate 26 as noted above. The plate 26, however, presents its entire face to the rear. The plug 26 has an internal opening 29 which receives a guide as will be described hereinafter.

The passage 24 communicates with a chamber 32 in the tail piece 20. The chamber 32 is defined by a surrounding structure which includes the tail piece. However, the chamber opens into a passage 33, the passage being formed in a captured piston 34. The piston 34 is threaded to the tail piece 20 by a set of threads found at 35. The piston 34 has a front face 37 which works against the top of an encircling cylinder 40. The cylinder 40 is shown in the drawings to fully enclose or encircle the piston 34. However, the cylinder is not connected with the tail piece 20 but merely bottoms out in movement at the shoulder defined at 41. The cylinder 40 shown in FIG. 1 to be at the left hand extremity of its movement is limited by the shoulder 41 on the tail piece 20. By way of contrast, the cylinder is able to move to the right of FIG. 2 with respect to the piston. The piston is fixed in location, while the cylinder moves relative to the piston and to the remainder of the apparatus. Movement of the cylinder 49 is communicated to the plate 26 to compress the resilient expandable plug 25.

The cylinder 40 is connected with the plate 26 by means of a projection 42 which extends into the opening 29 centered in the plate 26. The connection is positive due to arrangement of the components. Thus, as pressure fluid is introduced into the chamber 32, it flows through the passage 33 and acts against the face 37 of the piston to force the cylinder to the right of FIG. 1, expanding the resilient plug.

The numeral 44 identifies an encircling O-ring, which in conjunction with an additional wiper ring 45, prevents leakage along the face of contact defined by the piston and cylinder. As an alternative, the O-rings may be omitted and polypak seals may be substituted therefor. These seals are readily known in the industry.

It will be understood from the foregoing that the fluid introduced under pressure against the face 37 of the piston 34 forces the cylinder 40 to the right of FIG. 1. This imparts an expanding force to the plug 25. The plug 25 has an outer surface which expands toward the sleeve or liner 22 previously mentioned. This expansion alters the size of the annulus between the plug 25 and the surrounding sleeve. This therefore controls the flow rate through the device as previously mentioned. The problem which has been recognized by the present invention, and solved through the implementation of the device described herein, relates to the point of expansion of the resilient plug 25. It should expand somewhat uniformly with the largest bulge being located approximately at the center. However, substantially high pressure drops through the valve force the bulge toward the rear of the plug 25. As a consequence, the bulge can move to the back one-third, or perhaps one-quarter, of the plug. This subjects the plug to unwanted stresses, and can cause tearing away of large pieces of the plug or permanent compression set of the elastomer plug if the pressure drop is high enough.

The present invention copes with this by the inclusion of a means for limiting the rearward expansion of the plug indicated generally by the numeral 50 in FIG. 2. A plurality of radially outwardly extending vanes 51 are placed fully about the resilient plug 25. The vanes extend outwardly to a ring 52 which interconnects them. The ring 52 provides structural support to the vanes. It will be noted in FIG. 2 that substantial gap is found between the vanes. The ring 52 defines the substantial gap on both sides. These gaps are included to minimize the loss of flow capacity upon insertion of the device of the present invention in the annulus. The vanes and rings reduce the annulus slightly, but not sufficiently to create sizeable problems. As a generalization, the modified flow regulator as taught by the present invention has a slightly reduced flow rate, perhaps five to fifteen percent less than the flow regulator described in the previously issued patent for some common sizes.

Attention is redirected to FIG. 1 for additional consideration of the vane 51. The vane 51 has a shaped forward edge. The shaped forward edge is adapted to contact and shape the outer face of the plug 25 when the plug expands. As a practicality, the edge can be straight, but ideally, a curve is perhaps better. However, the provison of a number of vanes 51 fully surrounding the plug and having the shaped edge as shown in FIG. 1 limits the shape of the plug when it expands. The vanes force the bulge back toward the center portions of the plug. The bulge is not permitted to migrate on increasing pressure differentials to the rear of the plug. The bulge is forced forward to the dotted line position indicated by the numeral 55. The bulge 55 is to be constrasted with one where substantially all of the expansion is found at the rear of the plug.

The vanes 51 thus, in the aggregate, do not touch the plug 25 when it is in the unexpanded position shown in full line in FIG. 1, but constrain and limit its expansion in the manner shown by the dotted line position of the outer surface at 55. The vanes thus enable the flow regulator of the present invention to be utilized at extremely high pressure differentials. They not only force the bulge forward, but also lend structural support to the plug in a manner which prevents the tearing away of portions of the plug on substantially increased pressure differentials.

The vanes are supported in position by the encircling ring 52 and a second encircling ring 56. The ring 56 preferably abuts the back plate 26 and is received within a groove cut in the outer face of the plug 25. Thus, the ring 56 is recessed and does not present any limitation to flow through the flow regulator. The ring 56 joins the vanes at one end while the ring 52 supports them at the other end, thereby providing a structure with adequate mechanical support. The outer ring may be omitted if its strength is not required. Its inclusion permits the use of thinner vanes.

It will be noted that the means 50 is locked in position. The ring 56 which is received within a recess or encircling groove is not permitted to move inasmuch as it is forced to the right by the cylinder 40 and is caught by the groove in the rubber plug 25. The rubber plug thus abuts the ring 56 and provides a flush face therewith to hold the ring in position.

In operation, presume for ease of description that the device of the present invention is installed in a pipeline where the pressure differential is quite high, perhaps 500 PSI or greater. In this case, the plug in the unexpanded condition is not particularly effected by the extremely high pressure. However, as fluid is introduced into the passage 24 and into the chamber 32 and expands the gap at the face 37, the cylinder 40 is forced to the right. Movement of the cylinder 40 to the right bears on the end plate 26 and causes the plug 25 to expand. The plug 25 normally would expand with the bulge being somewhat symmetrical from front to back, and located at the approximate center of the plug. However, the extreme pressure differentials acting on the expanded plug normally tend to force the expanded portions of the plug to the rear or the downstream side. This tends to force the bulge to a point where the means 50 is installed. The means 50 which includes a number of vanes 51 which encircle the plug 25 bears on the outer face of the expanded or bulged plug in a manner to force the expansion of the plug back toward the proximate center of the plug. As shown in FIG. 1 in dotted line, at 55, the bulge is thus reshaped by the encircling means 50. The reshaping of the bulge reduces unwanted stresses which occur just below the surface in the plug 25 in the unmodified form, and thus substantially increases the life of the plug. The support lent by the means 50 measurably prevents the ripping or tearing away of pieces of the plug material. Consequently, the means 50 can be said to measurably reshape the plug so that it functions in the intended manner even though the pressure is tremendously increased over nominal pressures found in pipelines.

As a consequence of the use of the present invention, the plug can be used in circumstances not otherwise permitted. The life of the plug is extended substantially, and appears to be almost equal to that of the unmodified device when installed in a very low pressure situation.

The dotted line position of the bulge indicated at 55 in FIG. 1 of the drawings places the bulge in a position to work against th sleeve or liner 22. This position permits line contact or even a broad area of contact should the flow regulator expand sufficiently to fully close the passage to any flow whatsoever. The contact is acheved at the point desired with respect to the liner or sleeve 22, not at some point downstream which varies dependent upon the pressure in the pipeline.

The foregoing is directed to the preferred embodiment of the present invention. Many changes or alterations may be incorporated therein. The scope of the present invention is determined by the claims appended hereto.

What is claimed is:

1. A fluid flow regulator for a pipeline comprising, a tubular body having an inlet end and an outlet end, a plug of resilient material positioned within said body having peripheral clearance with the inner diameter thereof to define a flow control opening therewith, a first support member fixed in said body adjacent one end thereof, a second support member fixed in said body adjacent the other end thereof, both said support members having openings for the passage of fluid therethrough, means attaching one end of said plug to said first support member, a fluid actuator for radially expanding said plug to control fluid flow through said flow control opening, said actuator including a stationary piston attached to said second support member and a movable cylinder attached to the other end of said plug, and means supported in said flow control opening, radially spaced from said inner diameter and overlying the downstream end of the plug to control and limit the shape of the plug when expanded by the actuator.

2. The combination as defined in claim 1, wherein said plug control means includes a plurality of circumferentially spaced radially extending vanes.

3. The combination as defined in claim 2, wherein each of said vanes has a facing edge directed toward the outer surface of said plug.

4. The combination as defined in claim 2, wherein said vanes are supported by a ring at their inner edges, and said ring being carried by said movable cylinder.

5. The combination as defined in claim 2, wherein said vanes are interconnected by inner and outer rings at their inner and outer edges, and said inner ring being carried on said movable cylinder.

6. The combination as defined in claim 2, wherein said plug includes upstream, downstream and intermediate portions, and said vanes being positioned to limit the expansion of the downstream portion of the plug.

* * * * *